(12) United States Patent
Park et al.

(10) Patent No.: US 7,526,325 B2
(45) Date of Patent: Apr. 28, 2009

(54) TRIPLE-AXIS ROTATION FOLDER-TYPE PORTABLE APPARATUS

(75) Inventors: In-Gon Park, Seoul (KR); Chang-Soo Lee, Incheon (KR); Jasper Morrison, London (GB)

(73) Assignee: Samsung Electronics Co., Ltd (KR)

( * ) Notice: Subject to any disclaimer, the term of this patent is extended or adjusted under 35 U.S.C. 154(b) by 390 days.

(21) Appl. No.: 11/138,006

(22) Filed: May 26, 2005

(65) Prior Publication Data

US 2005/0282596 A1 Dec. 22, 2005

(30) Foreign Application Priority Data

Jun. 21, 2004 (KR) ...................... 10-2004-0045956

(51) Int. Cl.
*H04M 1/00* (2006.01)
(52) U.S. Cl. ................ 455/575.3; 455/575.1; 455/90.3; 455/566; 348/333.6; 348/373; 348/372; 348/333.13
(58) Field of Classification Search ............. 455/575.1, 455/575.2, 575.3, 90.3, 566; 348/333.6, 348/373, 372, 333.13
See application file for complete search history.

(56) References Cited

U.S. PATENT DOCUMENTS

| | | | | |
|---|---|---|---|---|
| 5,719,799 | A * | 2/1998 | Isashi | 708/105 |
| 6,658,272 | B1 | 12/2003 | Lenchik et al. | |
| 6,965,413 | B2 * | 11/2005 | Wada | 348/376 |
| 7,084,919 | B2 * | 8/2006 | Shibata et al. | 348/333.06 |
| 7,151,911 | B2 * | 12/2006 | Matsumoto | 455/90.2 |
| 7,336,782 | B2 * | 2/2008 | Watanabe et al. | 379/433.13 |
| 2001/0004269 | A1 * | 6/2001 | Shibata et al. | 348/333.06 |
| 2003/0001817 | A1 * | 1/2003 | Jeon | 345/156 |
| 2003/0013417 | A1 | 1/2003 | Bum | |
| 2003/0064758 | A1 * | 4/2003 | Mizuta et al. | 455/566 |
| 2003/0228847 | A1 | 12/2003 | Matsumoto | |
| 2004/0192422 | A1 * | 9/2004 | Watanabe et al. | 455/575.3 |
| 2005/0020239 | A1 * | 1/2005 | Kang et al. | 455/403 |
| 2005/0141703 | A1 * | 6/2005 | Hickey et al. | 379/433.13 |

(Continued)

FOREIGN PATENT DOCUMENTS

CN 2445520 Y 8/2001

(Continued)

*Primary Examiner*—Matthew D Anderson
*Assistant Examiner*—April S Guzman
(74) *Attorney, Agent, or Firm*—The Farrell Law Firm, PC

(57) ABSTRACT

A triple-axis rotation folder-type portable apparatus includes a main body having first and second regions positioned on the top surface thereof, the second region being adjacent to the first region; a folder adapted to rotate a first rotation angle about a first hinge axis from a state in which it faces the main body, to rotate a second rotation angle about a second hinge axis while being deflected which is perpendicular to the first hinge axis in such a manner that the top and bottom surfaces thereof are inverted, and to rotate a third rotation angle about a third hinge axis which is coaxial with the first hinge axis in such a manner that the top and bottom surfaces thereof are inverted to face and hide the first region while exposing the second region; and a hinge device for connecting the folder to the main body in such a manner that the folder can rotate about the first, second, and third hinge axes.

13 Claims, 5 Drawing Sheets

U.S. PATENT DOCUMENTS

2005/0261041 A1* 11/2005 Im .................... 455/575.3

FOREIGN PATENT DOCUMENTS

| CN | 1430816 | 7/2003 |
|----|---------|--------|
| CN | 1501740 | 6/2004 |
| EP | 1 207 671 | 11/2001 |
| EP | 1 271 897 | 6/2002 |
| EP | 1 298 890 | 9/2002 |
| EP | 1 357 726 | 4/2003 |
| EP | 1 411 707 | 10/2003 |

* cited by examiner

TRIPLE-AXIS ROTATION FOLDER-TYPE PORTABLE APPARATUS

PRIORITY

This application claims priority to an application entitled "Triple-Axis Rotation Folder-Type Portable Apparatus" filed with the Korean Intellectual Property Office on Jun. 21, 2004 and assigned Serial No. 2004-45956, the contents of which are hereby incorporated by reference.

BACKGROUND OF THE INVENTION

1. Field of the Invention

The present invention relates to portable communication apparatuses including cellular phones, PDAs (personal digital assistants), HHPs (hand held phones), camera phones, game phones, Internet phones, and digital communication apparatuses, and more particularly to a folder-type portable apparatus having a folder connected thereto in such a manner that it can rotate about three axes.

2. Description of the Related Art

In general, a "portable communication apparatus" refers to an electronic apparatus that a user can carry with him to perform wireless communication with a desired partner. In consideration of portability, designs of such apparatuses are not only compact, slim, and light, but also provide multimedia functionality for a wider variety of provided services. Future portable communication apparatuses are expected to be smaller, incorporate greater multi-functionality and multi-purpose utilization, and be suitable for various multimedia environments and Internet environments. At present, portable communication apparatuses are commonly used by people of all ages and walks of life, throughout the world, and are considered a nearly indispensable commodity that must be carried all the time.

Conventional portable communication apparatuses may be classified into various categories by appearance, such as bar-type, flip-type, and folder-type. The bar-type communication apparatuses have a single housing shaped like a bar. The flip-type communication apparatuses have a flip that is rotatably coupled to a bar-shaped housing by a hinge device. The folder-type communication apparatuses have a folder that is connected to a single bar-shaped housing by a hinge device so that the folder can rotate to fold onto or unfold from the housing.

Portable communication apparatuses may also be classified into neck-wearable communication apparatuses and wrist-wearable communication apparatuses according to the position at, or the way in which, a user puts on the communication apparatus. The neck-wearable communication apparatus is worn around the neck using a string, while the wrist-wearable communication apparatus is worn around the wrist.

In addition, portable communication apparatuses may be classified into rotation-type communication apparatuses and sliding-type communication apparatuses according to opening and closing of the communication apparatuses. In the rotation-type portable communication apparatuses, two housings are coupled to each other in such a manner that one housing rotates to be opened or closed relative to the other while they face each other. In the sliding-type portable communication apparatuses, two housings are coupled to each other in such a manner that one housing slides along a longitudinal direction to be opened or closed relative to the other. These variously classified portable communication apparatuses can be easily understood by those skilled in the art.

Conventional portable communication apparatuses are currently capable of transmitting data at a high speed in addition to voice communication because of an increase of demand by consumers.

Many recent portable communication apparatuses are also equipped with a camera lens for transmission of video signals; an external or imbedded camera lens module that enables a user to perform video communication with a desired partner or to take photographs of a desired subject.

However, folder-type portable apparatuses among conventional portable communication apparatuses are equipped with a folder adapted to fold on, and unfold from the main body about a single hinge axis. This creates a structural limitation and to use, as portable apparatuses having more functions appear in line with the trend of multimedia availability. For example, although conventional folder-type portable apparatuses are convenient for pressing keys in a phone mode, it is inconvenient in other modes such as the PDA mode or game mode since the display is blocked.

SUMMARY OF THE INVENTION

Accordingly, the present invention has been made to solve the above-mentioned problems occurring in the prior art, and an object of the present invention is to provide a folder-type portable apparatus having a folder mounted on the main body which is adapted to rotate about three axes.

Another object of the present invention is to provide a triple-axis rotation folder-type portable apparatus having a folder connected to the main body in such a manner that it can rotate about first, second, and third hinge axes while being inverted upside down for convenient use in a PDA mode, a game mode, and a music listening mode, particularly for convenience in performing key pressing operation or checking the displayed data.

Still another object of the present invention is to provide a triple-axis rotation folder-type portable apparatus having a folder adapted to completely rotate about a third hinge axis and to be stably positioned on the main body for providing the user with convenience in operating keys or checking the displayed data in a game mode, a music listening mode, a TV mode, and a VOD (video on demand) mode.

In order to accomplish this object, there is provided a triple-axis rotation folder-type portable apparatus including a main body having first and second regions positioned on the top surface thereof, the second region being adjacent to the first region; a folder adapted to rotate a first rotation angle about a first hinge axis from a state in which it faces the main body, to rotate a second rotation angle about a second hinge axis while being deflected which is perpendicular to the first hinge axis in such a manner that the top and bottom surfaces thereof are inverted, and to rotate a third rotation angle about a third hinge axis which is coaxial with the first hinge axis in such a manner that the top and bottom surfaces thereof are inverted to face and hide the first region while exposing the second region; and a hinge device for connecting the folder to the main body in such a manner that the folder can rotate about the first, second, and third hinge axes.

In accordance with another aspect of the present invention, there is provided a triple-axis rotation folder-type portable apparatus including a keypad having a first keypad and a second keypad positioned adjacently to the first keypad and a display device adapted to perform a first rotational movement of rotating a first rotation angle about a first hinge axis to expose the first and second keypads, a second rotational movement of rotating a second rotation angle about a second hinge axis which is perpendicular to the first hinge axis in such a manner that the top and bottom surfaces thereof are inverted, and a third rotational movement of rotating a third rotation angle about a third hinge axis which is coaxial with the first hinge axis in such a manner that the top and bottom surfaces thereof are inverted to hide the first keypad.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein will be omitted when it may make the subject matter of the present invention unclear.

Figure 1:
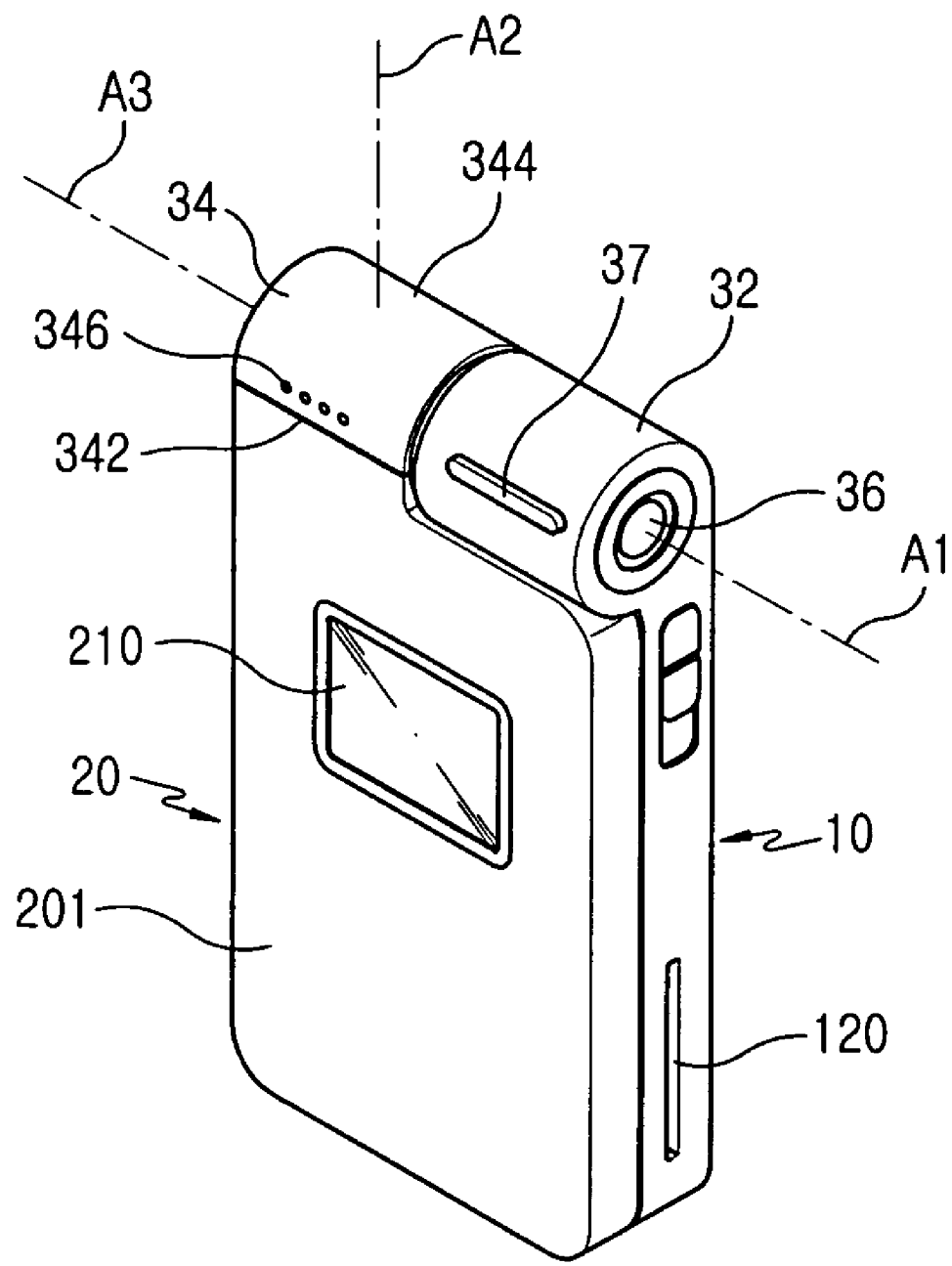
FIG. 1 is a perspective view illustrating a portable apparatus, with its folder completely unfolded, according to a preferred embodiment of the present invention.

The portable apparatus shown in the drawings is a folder-type portable apparatus. As shown in FIG. 1, a portable apparatus according to the present invention includes a main body 10; a folder 20 adapted to rotate about a first hinge axis A1 on the top surface 101 (shown in FIG. 2) of the main body 10, to rotate a second hinge axis A2 in such a manner that the top and bottom surfaces 201 and 202 (shown in FIG. 2) thereof are inverted, and to rotate about a third hinge axis A3 in such a manner that the top and bottom surface 201 and 202 thereof are inverted; and a hinge device for connecting the main body 10 and the folder 20 to each other in such a manner that the folder 20 can rotate about the first, second, and third hinge axes A1, A2, and A3. The second hinge axis A2 is perpendicular to the first hinge axis A1 and the third hinge axis A3 is in axial alignment with, or coaxial with, the first hinge axis A1.

The hinge device includes a fixed hinge arm 32 protruding in the vertical direction from an end of the main body 10; a rotational hinge arm 34 positioned adjacently to the fixed hinge arm 32 along the first hinge axis A1 to connect the folder 20 to the main body 10 in such a manner that the folder 20 can rotate about the first, second, and third hinge axes A1, A2, and A3 while these hinge axes extend through the folder 20; and a rotary hinge module (not shown in the drawings). The fixed hinge arm 32 is integral with the main body 10 and has keys 37 and 36 positioned on the outer peripheral surface and the lateral surface thereof, respectively. The key 37 positioned on the outer peripheral surface is a four-way key and the key 36 positioned on the lateral surface is a key related to a camera.

The rotational hinge arm 34 is rotatably assembled to the rotary hinge module (not shown) in such a manner that it can rotate relative to the main body 10. The rotational hinge arm 34 has a planar surface 342 formed on an end surface thereof which faces the folder 20 and a curved surface 344 formed on the other end surface thereof for smooth rotational motion on the top surface of the main body 10. A second speaker device 346 is positioned adjacently to the planar surface 342.

The folder 20 has a first display device 210 positioned on the top surface 201 thereof. The first display device 210 is made up of an LCD. The first display device 210 has a display region positioned on the top surface 201 of the folder. Particularly, only the first display device 210 is positioned on the top surface 201 of the folder to display inputted data.

Figure 2:
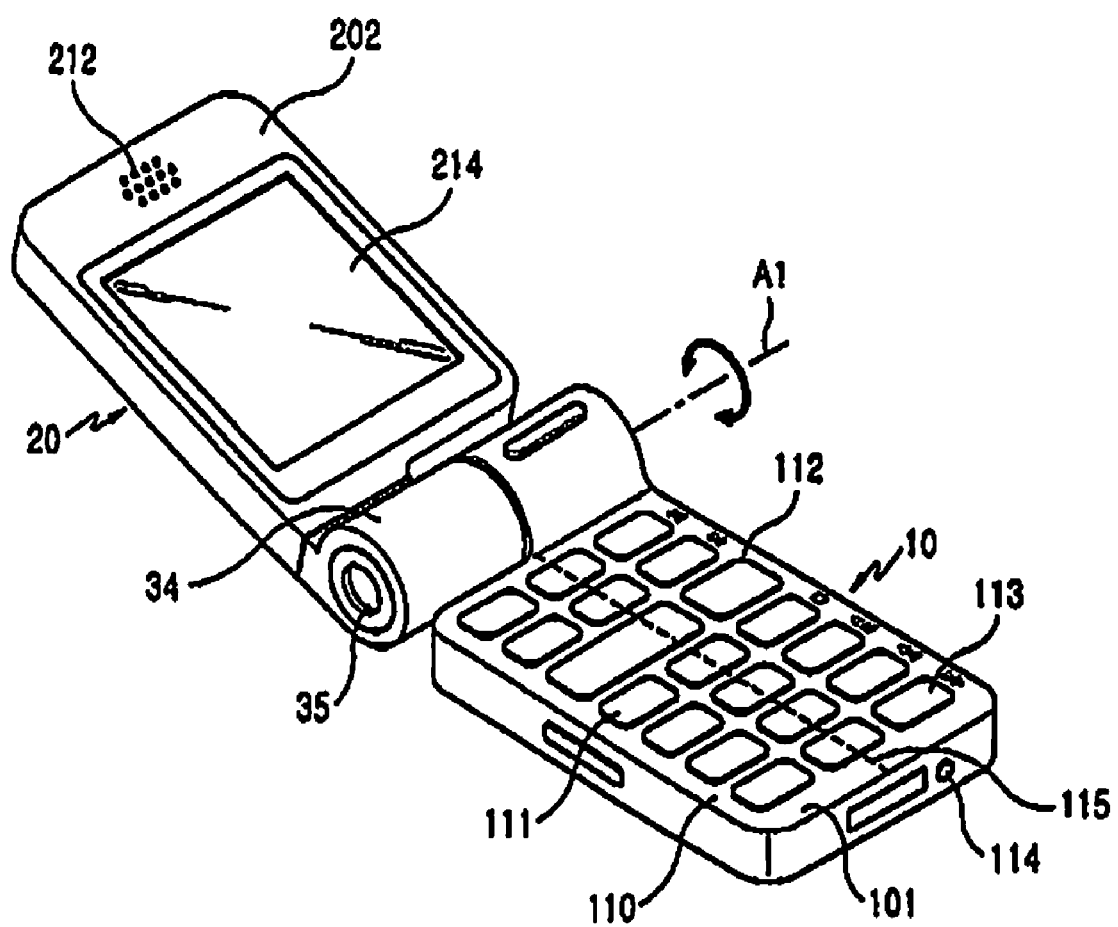
FIG. 2 is a perspective view illustrating a portable apparatus, with its folder completely rotated about a first hinge axis, according to a preferred embodiment of the present invention.

When the folder 20 is rotated a first rotation angle about the first hinge axis A1 as shown in FIG. 2, the top surface 101 of the main body and the bottom surface 202 of the folder are exposed to the user. The top surface 101 of the main body includes a first region 110 and a second region 112 positioned adjacently to the first region 110. Preferably, the first region 110 has a first keypad 111 positioned thereon which is made up of an array of a number of keys and the second region 112 has a second keypad 113 positioned thereon which is made up of an array of a number of keys. A microphone device 114 is positioned on the front end surface of the main body adjacently to the second keypad 113.

A division line 115 which distinguishes the first and second regions 110 and 112 from each other or which distinguishes the first and second keypads 111 and 113 from each other continuously extends linearly on the top surface 101 of the main body along the longitudinal direction of the main body. Preferably, the division line 115 is spaced from and parallel to the second hinge axis A2 when the folder 20 is completely folded on the main body 10. As will be described later, the first and second regions 110 and 112 are distinguished from each other according to whether the folder 20 is rotated to unfold or not. The area of the first region 110 may be equal to or different from that of the second region 112. Preferably, the area of the first region 110 is similar to or smaller than that of the second region 112. The second hinge axis A2 provides a deflected rotational motion of the folder 20 and its position determines whether the first region 110 is exposed or not.

The folder 20 includes a speaker device 212 positioned on the bottom surface 201 thereof and a second display device 214 positioned adjacently to the speaker device 212. The second display device 214 is preferably made up of an LCD.

In summary, the portable apparatus according to the first embodiment of the present invention includes the main body 10 and the folder 20 adapted to perform a first rotational movement of rotating about the first hinge axis A1 from the main body 10 to expose the first and second keypads 111 and 113, a second rotational movement of rotating about the second hinge axis A2 in such a manner that the top and bottom surfaces 201 and 202 thereof are inverted, and a third rotational movement of rotating about the third hinge axis A3 in such a manner that the top and bottom surfaces 201 and 202 thereof are inverted to hide the first keypad 111 and expose the second keypad 113.

In a state as shown in FIG. 2, the second display device 214 opposes the first and second keypads 111 and 113 about the first hinge axis A1.

The main body 10 has the first and second keypads 111 and 113 positioned thereon, which are made up of a number of keys, for use as a keypad. The folder 20 has the first and second display devices 210 and 214 positioned on the top and bottom surfaces 201 and 202 thereof, respectively. A camera lens 35 is positioned on the lateral surface of the rotational hinge arm 34 so that it is exposed.

Figure 3:
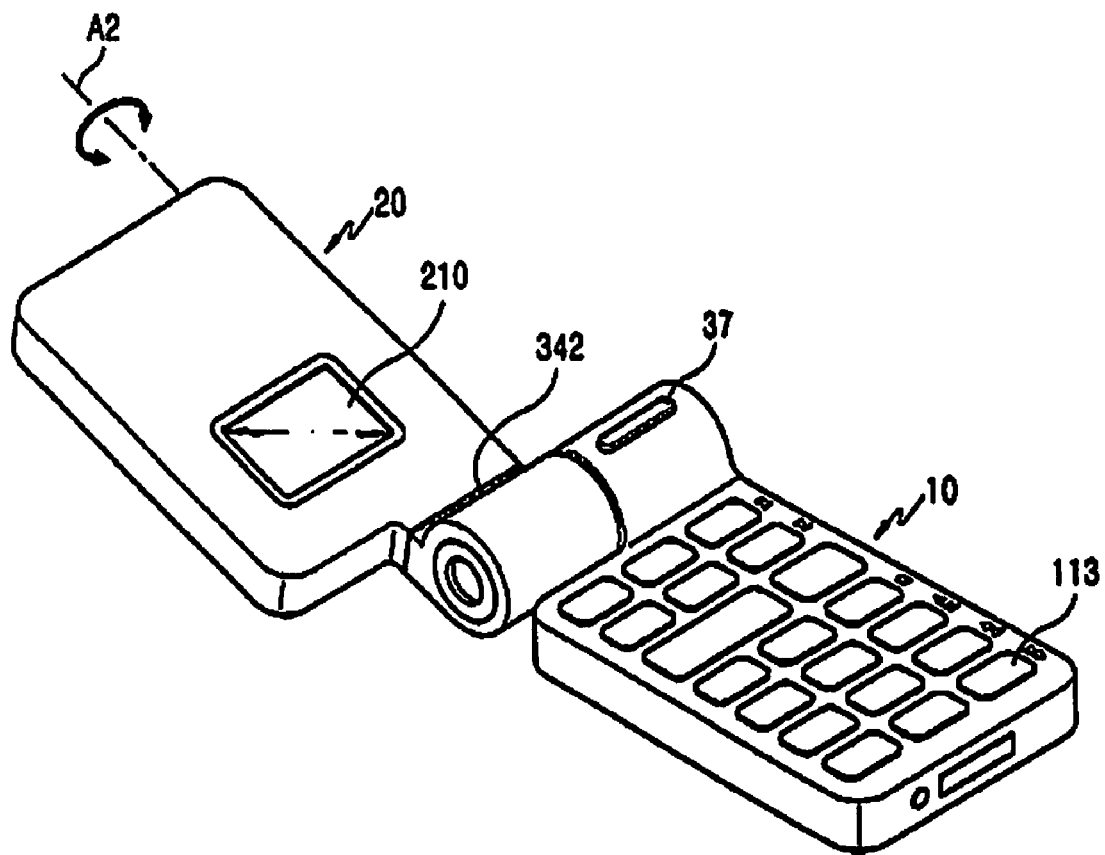
FIG. 3 is a perspective view illustrating a portable apparatus, with its folder completely rotated about a second hinge axis, according to a preferred embodiment of the present invention.

When the folder 20 has rotated a second rotation angle about the second hinge axis A2 as shown in FIG. 3, the top and bottom surfaces 201 and 202 of the folder 20 are inverted. Particularly, the first display device 210 faces the first and second keypads 111 and 113 about the first hinge axis A1.

Figure 4:
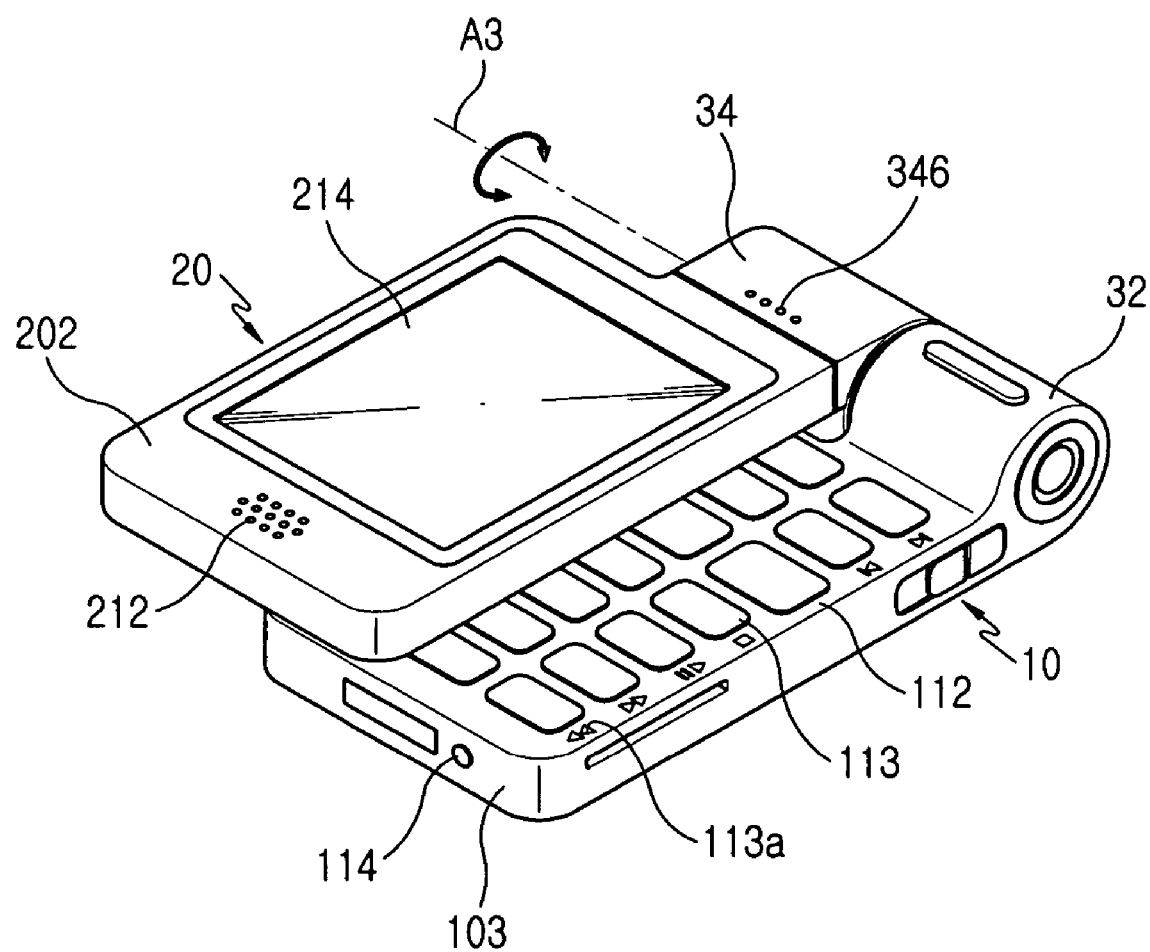
FIG. 4 is a perspective view illustrating a portable apparatus, with its folder completely rotated about a third hinge axis, according to a preferred embodiment of the present invention.

When the folder 20 has rotated a third rotation angle about the third hinge axis A3 as shown in FIG. 4, the top surface 201 of the folder 20 is positioned in such a manner that a part thereof (a region corresponding to the first keypad) faces the first keypad 111 and hides it while exposing only the second keypad 113. As such, only the second keypad 113 is exposed for use. The second display device 214 is positioned adjacently to the second keypad 113. The speaker device 212 also is positioned adjacent to the second keypad 113. There is a difference in level between the bottom surface 202 of the folder and the second region 102 of the main body 10 when the folder 20 is placed on the first region 110 of the top surface of the main body 10.

FIG. 2 corresponds to a state wherein the folder 20 is completely rotated about the first hinge axis A1, FIG. 3 corresponds to a state wherein the folder 20 is completely rotated about the second hinge axis A2, and FIG. 4 corresponds to a state wherein the folder 20 is completely rotated about the third hinge axis A3.

The portable apparatus is preferably used as a phone in the state shown in FIG. 2, and is preferably used in a music listening mode, a game mode, a TV mode, or a VOD mode when configured as shown in FIG. 4. Key input is easier and data is displayed on a larger screen using the second display device 214.

Additionally, marking portions 113a are printed next to the second keypad 113 to provide a keypad function when only the second keypad 113 is used. The first and second speaker devices 212 and 346 are used when folded as shown in FIG. 4 to provide stereo sound. This is useful when playing games, watching TV, VOD or listening to music. The marking portions 113a are preferably positioned along the vertical direction to be easily recognizable.

Figure 5:
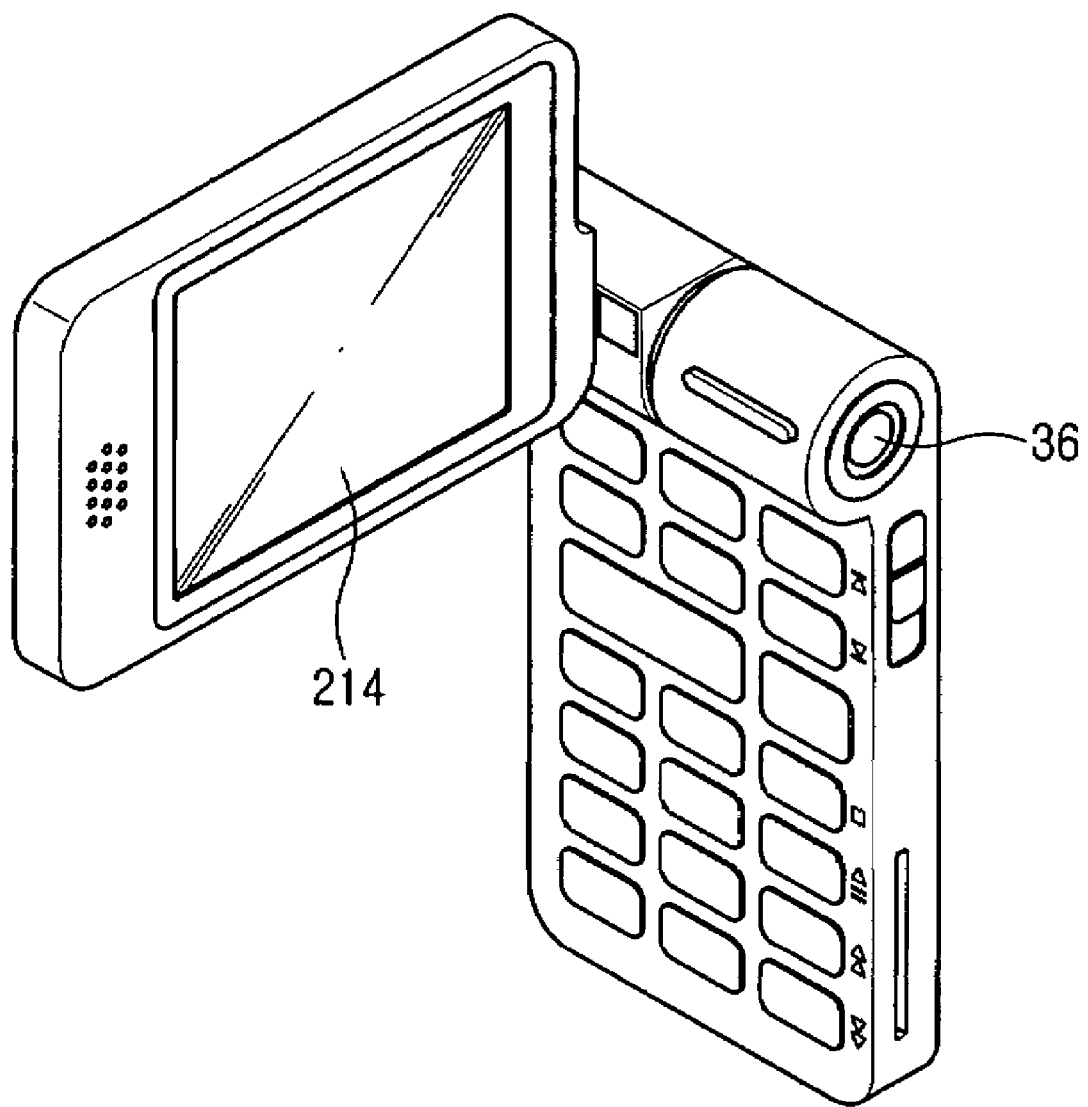
FIG. 5 is a perspective view illustrating a portable apparatus in a camera mode according to a preferred embodiment of the present invention.

The portable apparatus is preferably used as a camera when folded as shown in FIG. 5. The user can conveniently take pictures of a desired object by directing the camera lens 35 (shown in FIG. 2) toward the object while watching the second display device 214 to check a preview of the photograph. The single key 36 is a key related to the camera.

Preferably, the first rotation angle about the first hinge axis A1 is in the range of 0-180°, the second rotation angle about the second hinge axis A2 is in the range of 0-180°, and the third rotation angle about the third hinge axis A3 is in the range of 0-180°. The second rotation angle is preferably 180°, because the top and bottom surfaces 201 and 202 of the folder 20 should be completely inverted, and is preferably about 90° in camera mode.

In summary, the portable apparatus according to the present invention has a folder adapted to rotate about a first, second, and third hinge axes so that the top and bottom surfaces thereof are inverted three times for key input in a phone mode, a game mode, a PDA mode, a video watching mode, and a music listening mode, as well as for convenience in checking displayed data through a larger display device.

As mentioned above, the portable apparatus according to the present invention provides easier key input in a phone mode, a game mode, a camera mode, a video watching mode, a TV watching mode, a music listening mode, and a PDA mode with a larger display screen and stereo sound. While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A folder-type portable apparatus comprising:
a main body having a main top surface receiving a first keypad and a second keypad being adjacent to the first keypad and adjacent to marking portions located along a longitudinal edge of the main top surface;
a folder having a folder top surface and a folder bottom surface being opposite the folder top surface, the folder rotating, with respect to the main body, about a first hinge axis and about a second hinge axis perpendicular to the first hinge axis, in a plurality of positions including a first folded position wherein the folder top surface faces the main top surface, covers the first keypad and exposes the second keypad; and
a hinge device for connecting the folder to the main body in such a manner that the folder can rotate about the first and second hinge axes.

2. A folder-type portable apparatus as claimed in claim 1, wherein the main body has a microphone device positioned on a front end surface thereof adjacent to the second keypad and a slot positioned on a lateral surface thereof adjacent to the microphone device.

3. A folder-type portable apparatus as claimed in claim 1, wherein the hinge device comprises a fixed hinge arm formed on the main body and a rotational hinge arm positioned on an end of the main top surface adjacent to the fixed hinge arm along the first hinge axis to connect the folder to the main body in such a manner that the folder can rotate about the first and second hinge axes while the first and second hinge axes extend through the folder.

4. A folder-type portable apparatus as claimed in claim 1, wherein a division line which divides the top main surface into a first region and a second region linearly extends along a longitudinal direction of the main body, the first region receiving the first keypad, the second region receiving the second keypad, and, when the folder is in one of the first folded position and a second folded position wherein the folder bottom surface faces the main top surface, the second hinge axis is spaced from and parallel to the division line.

5. A folder-type portable apparatus as claimed in claim 1, wherein the folder includes a first display device positioned on the folder top surface, a second display device positioned on the folder bottom surface, and a first speaker device positioned adjacent to the second display device.

6. A folder-type portable apparatus as claimed in claim 1, wherein the plurality of positions includes a first open position wherein the folder bottom surface and the main top surface oppose each other about the first hinge axis and face about a same direction, a second open position wherein the folder top surface and the main top surface oppose each other about the first hinge axis and face about the same direction, and a third open position wherein the folder bottom surface is about perpendicular to the main top surface.

7. A folder-type portable apparatus as claimed in claim 3, wherein an end surface of the rotational hinge arm is a planar surface adapted to face the folder and another end surface thereof is a curved surface for smooth rotational motion on the main top surface, the rotational hinge arm having a second speaker device positioned on an outer peripheral surface thereof and a camera lens positioned on a lateral surface thereof.

8. A folder-type portable apparatus as claimed in claim 1, wherein there is a difference in level between the folder bottom surface and the main top surface in the first folded position.

9. A folder-type portable apparatus as claimed in claim 1, wherein stereo sound is provided in the first folded position.

10. A folder-type portable apparatus comprising:
- a keypad having a keypad top surface receiving a first keypad and a second keypad positioned adjacent to the first keypad and adjacent to marking portions located along a longitudinal edge of the keypad top surface; and
- a display device having a display top surface and a display bottom surface being opposite the display top surface, the display device rotating, with respect to the keypad, about a first hinge axis and about a second hinge axis perpendicular to the first hinge axis, in a plurality of positions including a first folded position wherein the display top surface faces the keypad top surface, covers the first keypad and exposes the second keypad.

11. A folder-type portable apparatus as claimed in claim 10, wherein the display device includes a first display device positioned on the display top surface and a second display device positioned on the display bottom surface, and wherein first and second speaker devices are positioned about the second display device in the first folded position.

12. A folder-type portable apparatus as claimed in claim 10, wherein a division line which divides the first and second keypads from each other continuously extends linearly along a longitudinal direction of the keypads.

13. A folder-type portable apparatus as claimed in claim 11, wherein the plurality of positions includes a first open position wherein the display bottom surface and the keypad top surface oppose each other about the first hinge axis and face about a same direction, a second open position wherein the display top surface and the keypad top surface oppose each other about the first hinge axis and face about the same direction, and a third open position wherein the display bottom surface is about perpendicular to the keypad top surface.

* * * * *